United States Patent Office 3,022,279
Patented Feb. 20, 1962

3,022,279
PROCESS FOR MAKING HYDROLYZED
POLYACRYLAMIDE
Arthur C. Proffitt, Auburn, Mich., assignor to The Dow
Chemical Company, Midland, Mich., a corporation of
Delaware
No Drawing. Filed May 6, 1959, Ser. No. 811,272
5 Claims. (Cl. 260—89.7)

This invention is concerned with a process for producing hydrolyzed polyacrylamide and is particularly directed to a method for producing homogeneously hydrolyzed polyacrylamide which has a high molecular weight and is substantially completely water-soluble.

For the production of high molecular weight hydrolyzed polyacrylamide it has been suggested that polyacrylamide in aqueous solution be hydrolyzed to the desired extent with caustic alkalies. However, the preparation of a homogeneous hydrolyzed polyacrylamide product by such method is difficult because the high viscosity of aqueous solutions of high molecular weight polyacrylamides makes it difficult to achieve a uniform mixing of the caustic alkali solution with the polymer. Thus, in such method of operation, it is generally found that some of the polymer is hydrolyzed to a greater extent than desired while other portions of the polymer undergo little or no hydrolysis. Recently, it has been suggested in U.S. Patent 2,820,777 to prepare partially hydrolyzed polyacrylamides by polymerizing acrylamide in an aqueous medium containing sodium hydroxide. However, it has been found that such method does not produce the relatively high molecular weight polymers which are particularly desirable for use in the sedimentation of finely divided suspended solids from aqueous media and in certain other uses.

It is an object of the present invention to provide an improved method for polymerizing and partially hydrolyzing acrylamide in a single step operation. It is a further object of the invention to provide a method whereby partially hydrolyzed polyacrylamide of high molecular weight and excellent water-solubility may be produced. Yet another object is to provide a method for producing partially hydrolyzed polyacrylamides characterized by uniformity in the degree of hydrolysis and wherein the product is substantially free of unreacted monomer. Other objects will become apparent from the following specification and claims.

In accordance with the present invention it has been discovered that partially hydrolyzed polyacrylamide, characterized by uniformity of hydrolysis, by high molecular weight and by a high degree of water-solubility, can be produced by polymerizing acrylamide under controlled temperature conditions in an aqueous medium containing sodium carbonate and a polymerization catalyst.

In carrying out the invention, acrylamide is dissolved in water together with sodium carbonate and a polymerization catalyst is added thereto. In general, it is desirable to employ one or more inorganic or organic peroxides as catalysts and to initiate the reaction at as low a temperature as possible. Alternatively, other sources of free radicals for the initiation of the reaction, such as ultri-violet light or gamma rays, may be employed. In practice, it is preferred to initiate the reaction by adding one or more peroxide catalysts or a mixture of such catalyst or catalysts with a modifying agent such as a mercaptan while maintaining the mixture at a suitable initial temperature. Inhibitory metallic ions such as copper ions may be deactivated by addition of a sequestering agent such as sodium ethylene-diamine tetraacetate. The reaction starts readily when the reactants are contacted with the catalyst at a reaction temperature and proceeds with the evolution of heat. In general, it is preferred to initiate the reaction at a relatively low temperature of from about 20° to at most 55° C. and starting temperatures of less than 50° C. are preferable. Efficient polymerization is obtained when oxygen is excluded from the reaction mixture and it is generally desirable to purge oxygen from the system by running a stream of inert gas such as nitrogen through the acrylamide-sodium carbonate solution before introducing the polymerization catalyst.

The proportions of reactants employed may be varied depending upon the molecular weight and degree of hydrolysis of polymer desired. Thus, the employment of minimal proportions of catalyst to acrylamide monomer generally favors the production of higher molecular weight polymer while the degree of hydrolysis will vary more or less directly with the proportion of sodium carbonate to acrylamide monomer employed. The exact mechanism of the hydrolysis reaction is not completely understood but the reaction appears to proceed in accordance with the following equation:

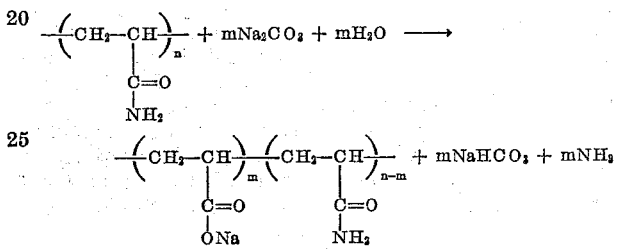

wherein the ratio $m/n$ may vary from about $1/10$ to about $2/3$, inclusive. In the above structural representation of the hydrolyzed polymer on the right of the equation, it is to be understood that the sodium carboxylate groups and carboxamide groups may be distributed at random along the polymer chain. In accordance with the above ratios, from about 0.1 to about 0.67 molar proportion of sodium carbonate is employed to each molar proportion of acrylamide monomer in the reaction mixture.

In general, the polymerization and hydrolysis reaction is carried out in aqueous solution so that the water required in the above equation is readily available. Good results have been obtained with a reaction mixture comprising an aqueous solution containing from about 5 to 20 percent by weight, preferably from about 10 to 15 percent by weight, of acrylamide monomer and from about 200 to 1000 parts by weight of peroxide catalyst or mixture of catalysts per million parts of said monomer. Up to about 10 to 15 mole percent of the acrylamide can be replaced by other suitable monoethylenically unsaturated monomers such as acrylonitrile, methacrylamide, vinyl acetate and the like. As catalysts, any of the polymerization catalysts suitable for vinyl polymerizations can be employed such as organic and inorganic peroxides and hydroperoxides, salts of inorganic per-acids and the like. Similarly, known polymerization modifiers, such as mercaptans and their derivatives, may be incorporated with the catalyst. The alkali metal persulfates or mixtures of such persulfates with tertiaryalkyl hydroperoxides are preferred catalysts.

The following examples illustrate the invention but are not to be construed as limiting the same:

*Example 1*

A 15.7 percent by weight aqueous solution of acrylamide (containing 236 pounds of acrylamide) was placed in a reactor kettle equipped with a mechanical stirrer and purged of dissolved oxygen by bubbling nitrogen therethrough. A concentrated aqueous solution containing 90.5 pounds of sodium carbonate was similarly purged with nitrogen and added to the acrylamide solution. The resulting mixture was heated gradually to a temperature of 47° C. When said temperature was attained, a blanket of nitrogen was maintained over the mixture and aqueous 1 percent by weight solutions of each of the ingredients in the following table were added in amounts to supply the indicated concentration in parts by weight per million parts of acrylamide in the reaction mixture.

Ingredient: Concentration, p.p.m.

Disodium ethylenediamine tetraacetate_____ 3000
    Potassium persulfate_____ 300
    Tertiarybutyl hydroperoxide_____ 100
    2-mercaptoethanol _____ 100

When the latter ingredients were added with stirring, polymerization was initiated rapidly and the temperature of the mixture rose. Polymerization and concurrent hydrolysis proceeded to substantial completion to produce a hydrolyzed polyacrylamide product as a rubbery gel. The latter was dried on a double-drum drier to produce a white flaky dried product. This product contained byproduct sodium bicarbonate; however, such a product is suitable for use without further purification in applications such as the settling of coal washery slimes.

A portion of the above dried product was dissolved in aqueous 4 percent by weight sodium chloride solution to produce a 0.5 percent by weight solution of said dried product. This solution was found to have a viscosity of 25.4 centipoises at 25° C. as determined with an Ostwald-type viscosimeter. Titration showed the polymer to have been hydrolyzed to convert about 33 percent of the carboxamide groups to sodium carboxylate groups.

*Example 2*

Further batches of acrylamide were polymerized in solution with sodium carbonate by the general procedure of Example 1. The amounts of acrylamide monomer and of sodium carbonate employed in the various batches and the concentration of said monomer in the reaction mixture are given in the following table:

| Batch No. | Acrylamide, Pounds | $Na_2CO_3$, Pounds | Concentration of Acrylamide, Percent by Weight |
|---|---|---|---|
| 1 | 263 | 100 | 12.5 |
| 2 | 261 | 100 | 12.4 |
| 3 | 194 | 50 | 12.9 |

The catalyst mixtures and starting temperatures were varied in the different batches as set forth in the following tables, wherein EDTA stands for sodium ethylenediaminetetraacetate, BHP stands for tertiarybutyl hydroperoxide, p.p.m. indicates the parts by weight of ingredient per million parts by weight of acrylamide in the reaction mixture and "starting temp." is the temperature at which the polymerization reaction was initiated.

| Batch No. | EDTA, p.p.m. | $K_2S_2O_8$, p.p.m. | BHP p.p.m. | 2-Mercaptoethanol, p.p.m. | Starting Temp., °C. |
|---|---|---|---|---|---|
| 1 | 3,000 | 300 | 100 | 100 | 52 |
| 2 | 3,000 | 500 | 200 | 50 | 38 |
| 3 | 2,000 | 300 | 200 | None | 36 |

Each of the products from the above polymerizations was dried as in Example 1 and the resulting dried product tested to determine water solubility, residual unreacted monomer, percent hydrolysis of carboxamide groups to carboxyl groups and the viscosity at 25° C. of a 0.5 percent by weight solution of the product in aqueous 4 percent by weight sodium chloride solution. Each product was found to be substantially completely soluble in water. Other properties of the products are summarized in the following table:

| Batch No. | Residual Monomer, Percent by Weight | Percent Hydrolysis | 0.5 Percent Solution Viscosity, Centipoises |
|---|---|---|---|
| 1 | 0.055 | 36 | 25.3 |
| 2 | 0.015 | 31 | 29.8 |
| 3 | 0.045 | 24 | 55.0 |

*Example 3*

Batches of acrylamide were polymerized as follows. About 1300 gallons of aqueous acrylamide solution, containing about 1460 pounds of acrylamide, was placed in a glass-lined Pfaulder kettle equipped with a stirrer and suitable vents. A solution containing 500 pounds of sodium carbonate was added and mixed with the acrylamide solution while maintaining said solution at a temperature below 25 degrees. Thereafter, nitrogen was bubbled through the solution to remove dissolved oxygen and a catalyst mixture consisting of sodium ethylenediaminetetraacetate, potassium persulfate and tertiarybutyl hydroperoxide was added with stirring while maintaining the solution at a temperature of about 23° C. The addition of the catalyst mixture provided 2000 parts of sodium EDTA, 200 parts of potassium persulfate and 150 parts of tertiarybutyl hydroperoxide per million parts of acrylamide in the solution. The polymerization reaction was initiated when the catalyst mixture was added and the temperature of the reaction mixture rose gradually and passed through a peak of about 70° C. As the temperature rose the hydrolysis reaction was initiated as evidenced by the evolution of ammonia gas. The total time in the reaction kettle, including time required for admixing the sodium carbonate, was about 11 hours. The product, a thick viscous gel, was dried on a steel, double-drum drier to produce a dried, flaked product characterized by a viscosity of 27 centipoises for a 0.5 percent by weight solution thereof in aqueous 4 percent by weight/volume sodium chloride at a temperature of 25° C. The resulting hydrolyzed polyacrylamide had about 27 percent of its carboxamide groups hydrolyzed to sodium carboxylate groups, contained less than 0.1 percent by weight of residual unreacted acrylamide monomer and was substantially completely soluble in water and in 4 percent sodium chloride solution.

The viscosity property employed as a characteristic property of the polymers in the above examples is dependent upon the molecular weight of the polymer. Thus, for example, such polymers having viscosities of from about 23 to 30 centipoises for a 0.5 percent by weight solution in aqueous 4 percent sodium chloride solution have molecular weights of from about 1,700,000 to about 3,000,000 while the polymer having a viscosity of 55 centipoises for such a solution had a molecular weight of the order of 4,000,000. In all of the viscosity measurements discussed above including those in the examples, the solutions employed were adjusted to a pH of 7.

It will be noted in the working examples that the reaction does not proceed precisely as in the chemical equation set forth earlier in the specification and a higher degree of hydrolysis is achieved than can be accounted for on a stoichiometric basis from said equation. The exact mechanism of this reaction is not completely understood. A possible explanation is based on the fact that under the reaction conditions some of the byproduct sodium bicarbonate may be reconverted to sodium carbonate which can then react with further carboxamide groups. In any case products having a desired degree of hydrolysis can be reproducibly prepared by adjustment of the ratio of sodium carbonate to acrylamide when using any particular catalyst mixture.

I claim:
1. A method for producing high molecular weight wa- ter-soluble hydrolyzed polyacrylamide which comprises the steps of forming a homogeneous aqueous solution containing at least about 5 percent by weight of acrylamide as substantially the sole polymerizable ingredient and sodium carbonate in the amount of from about 0.1 to about 0.67 mole per mole of acrylamide in the reaction mixture, introducing into said solution a polymerization catalyst capable of producing free radicals and initiating polymerization at a temperature of from about 20° to 55° C. to produce a substantially homogeneous water-soluble polymer product.

2. A method according to claim 1 wherein the polymerization is initiated at a temperature of below 50° C.

3. A method according to claim 1 wherein the acrylamide in the aqueous medium is present in the amount of from about 5 to 20 percent by weight of the reaction mixture.

4. A method according to claim 1 wherein the polymerization catalyst consists of peroxide catalysts and is employed in the amount of from about 200 to 1000 parts by weight per million parts by weight of acrylamide in the reaction mixture.

5. A method which comprises forming an aqueous solution containing from about 5 to 20 percent by weight of acrylamide as substantially the sole polymerizable ingredient and from about 0.1 to about 0.67 mole of sodium carbonate per mole of acrylamide, purging oxygen from said solution by bubbling a stream of inert gas therethrough, adjusting the temperature of said solution within the range of from about 20° C. to 55° C. and initiating polymerization by introducing into the solution from about 200 to 1000 parts by weight of peroxide catalyst per million parts by weight of acrylamide.

References Cited in the file of this patent

UNITED STATES PATENTS

| | | |
|---|---|---|
| 2,625,537 | Kolthoff et al. | Jan. 13, 1953 |
| 2,878,237 | Russell et al. | Mar. 17, 1959 |